United States Patent [19]
Hill

[11] 3,779,278
[45] Dec. 18, 1973

[54] FAUCET
[75] Inventor: Larry M. Hill, Frankfort, Ind.
[73] Assignee: Indiana Brass Company, Inc., Frankfort, Ind.
[22] Filed: Sept. 21, 1971
[21] Appl. No.: 182,438

[52] U.S. Cl................ 137/597, 137/606, 137/610, 137/625.5
[51] Int. Cl............................................ F16k 11/00
[58] Field of Search.................... 137/597, 119, 610, 137/625.48, 625.49, 625.5, 801, 467; 4/148

[56] References Cited
UNITED STATES PATENTS

| | | |
|---|---|---|
| 1,666,531 | 4/1928 | Glauber .......................... 4/148 UX |
| 2,218,662 | 10/1940 | Smith.................................. 137/597 |
| 1,089,503 | 3/1914 | Slinack ............................ 137/625.5 |
| 3,080,570 | 3/1963 | Weddendorf.................... 137/119 X |
| 2,661,762 | 12/1953 | Bryant ...................... 137/625.48 X |
| 1,196,405 | 8/1916 | Steeg ............................... 137/801 X |
| 3,236,253 | 2/1966 | Symmons............................ 137/119 |

Primary Examiner—Robert G. Nilson
Assistant Examiner—Edward Look
Attorney—Paul J. Reising et al.

[57] ABSTRACT

A faucet including a housing having hot and cold water inlets and a spout portion. A first outlet is formed in the spout portion for directing water from the faucet to a sink or lavatory, and a second outlet is formed in the housing at a position remote from the first outlet for directing the water to a tub or shower. A diverter tube has one end supported in the housing and communicating with the second outlet with its other end spaced from the first outlet. A diverter valve recess is formed in the spout and a diverter valve assembly is mounted in the recess for controlling communication between the hot and cold water inlets and either the diverter tube or the first outlet so that actuation of the diverter valve determines whether or not water flows from the first or second outlets.

14 Claims, 4 Drawing Figures

INVENTOR.
Larry M. Hill
BY
Barnard, McDlynn & Reising
ATTORNEYS

INVENTOR.
Larry M. Hill

FAUCET

This invention relates generally to faucets for directing flow from hot and cold water sources to one of two outlets, and is particularly concerned with such faucets designed primarily for use in mobile homes or the like where space and manufacturing costs are critical.

Many of the presently available faucets have valves for directing the flow from hot and cold water inlets either to a sink or lavatory outlet, or to a tub or shower outlet. Early leakage occurs in this type of arrangement when the shower control is arranged in such a manner that the line to the shower head is pressurized at all times. If a flexible conduit extends from the faucet to the shower head, early deterioration of the flexible conduit results when the shower head is pressurized at all times.

In mobile homes and similar installations wherein space is at a premium, it is frequently necessary to use the faucet for a sink or lavatory to control a shower head or tub outlet. Due to space limitations, the dimensional tolerances for such faucets are small and it is difficult to provide a suitable design that meets the dimensional limitations and at the same time can be economically manufactured on a mass production basis. Moreover, the dimensional limitations make it difficult to provide a faucet having a reliable diverter valve assembly for directing the flow either to a sink or shower outlet of the faucet.

It is therefore one of the objects of this invention to provide a faucet construction having two alternate outlets with a diverter valve assembly operable to selectively divert the flow to either of the two outlets and wherein neither of the outlets is pressurized except when in use.

A further object is to provide a faucet construction having a diverter valve assembly capable of diverting the water flow from a primary outlet to a secondary outlet by a simple push-pull action of the diverter valve.

A further object is to provide a faucet construction having a sink and shower outlet with a diverter valve assembly for selectively directing the flow to either the sink or shower outlet that can be assembled to the faucet and removed therefrom with ease for replacement and repair.

In carrying out the foregoing, and other objects, a faucet construction according to the present invention includes a housing having a pair of fluid inlets for connection with the hot and cold water sources and a spout portion communicating with the inlets. Formed in the spout portion is a first outlet for directing flow from the inlets to a sink or lavatory, and a second outlet is formed in the housing at a position remote from the first outlet for directing flow from the inlets to either a shower head or tub outlet. A diverter tube member has one end supported in the housing and extends coaxially with the spout portion and is in fluid communication with the second outlet. A diverter valve recess is formed in the spout portion in coaxial relationship with the diverter tube, and a diverter valve assembly is mounted in the diverter valve recess. The diverter valve assembly is selectively operable between a first position permitting fluid communication between the inlets and the second outlet through the diverter tube while simultaneously blocking fluid communication between the inlets and the first outlet, and a second position permitting fluid communication between the inlets and the first outlet while simultaneously blocking fluid communication between the inlets and the diverter tube. In assembling the faucet during manufacturing, the housing can be cast, and a recess for the diverter valve assembly bored or drilled into the end of the spout portion. The diverter tube can be inserted through the drilled opening and mounted in a supporting recess in press fit engagement therewith. The diverter valve assembly can then be mounted in the diverter valve recess and retained therein by a set screw or the like.

Other objects, advantages and features of the invention will become apparent from the following description taken in connection with the accompanying drawings in which.

Figure 1:
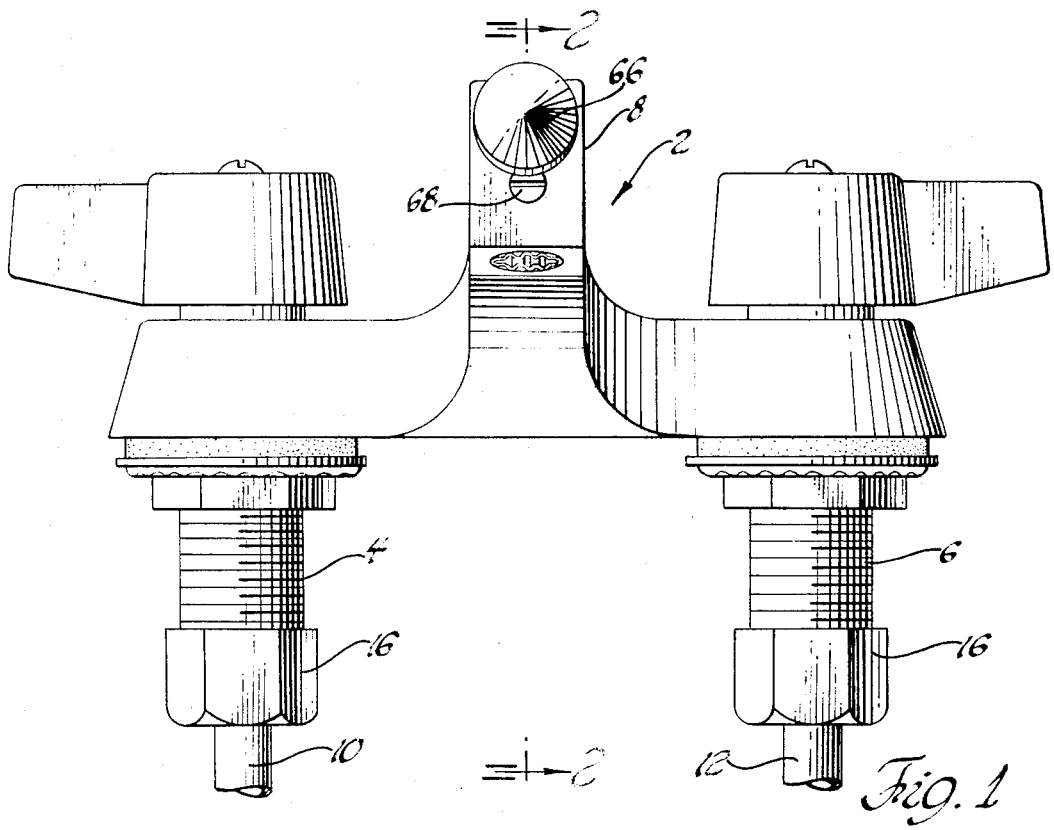
FIG. 1 is a front elevation of a faucet construction according to the present invention.

In the drawings, reference numeral 2 designates a faucet housing having hot and cold water inlets 4 and 6 and a spout portion 8. Inlets 4 and 6 are connected with supply pipes 10 and 12 from hot and cold water sources, respectively, by coupling nuts 16 with cone packings 15 received therein and seated against washers 17. Water from the inlets 4 and 6 flows into a mixing chamber 14 in the housing 2. Communication between the inlets 4 and 6 and the mixing chamber 14 is controlled by identical manually operable valve assemblies 18.

From the mixing chamber 14, the water flows from the faucet either through a first outlet 20 formed in the spout portion 8 or a second outlet 22 in the housing at a location remote from the spout outlet 20. A fitting 24 is threadedly mounted in the outlet 22 for connection with a pipe or other conduit to a shower head or tub outlet.

A partition 26 separates the mixing chamber 14 from the second outlet 22, and an opening in the partition 26 defines a support for one end 29 of a diverter tube 28 which extends from the partition 26 in generally parallel relationship with the longitudinal axis of the spout portion 8. A chamber or compartment 30 on the opposite side of partition 26 from the mixing chamber 14 defines a passage connecting the diverter tube with the outlet 22, outlet 22 being formed in one wall of chamber 30, and one end of the diverter tube 28 being mounted in another wall of chamber 30.

Extending from the outer end of the spout portion 8 is a drilled or bored opening defining a diverter valve recess 32 in the spout 8. Diverter valve means designated collectively by reference numeral 34 is mounted in the recess 32, the diverter valve means 34 having a first position illustrated in FIG. 4 permitting fluid communication between the inlet means 4 and 6 through the mixing chamber 14 and the other end 31 of the diverter tube 28, while simultaneously blocking fluid communication between the fluid inlet means and the first outlet 20, and a second position illustrated in FIG. 2 permitting fluid communication between the inlet means 4 and 6 and the first outlet 20 while simultaneously blocking fluid communication between the inlet means 4 and 6 and the diverter tube 28.

Figure 2:
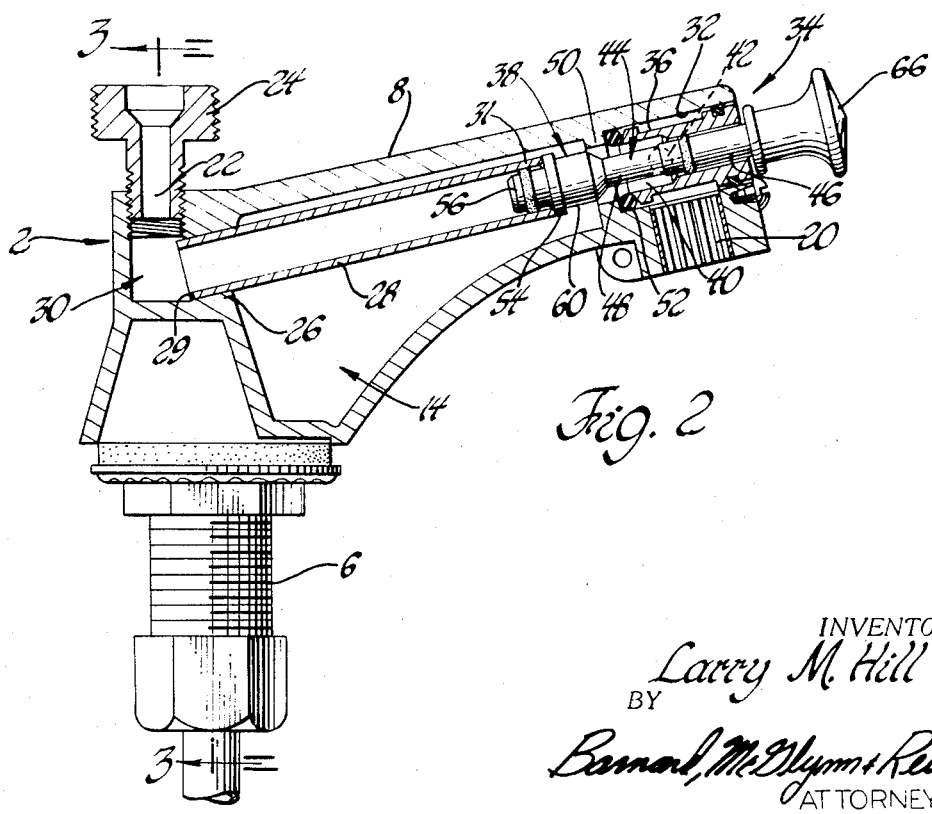
FIG. 2 is a sectional view taken on lines 2—2 of FIG. 1.
Figure 4:
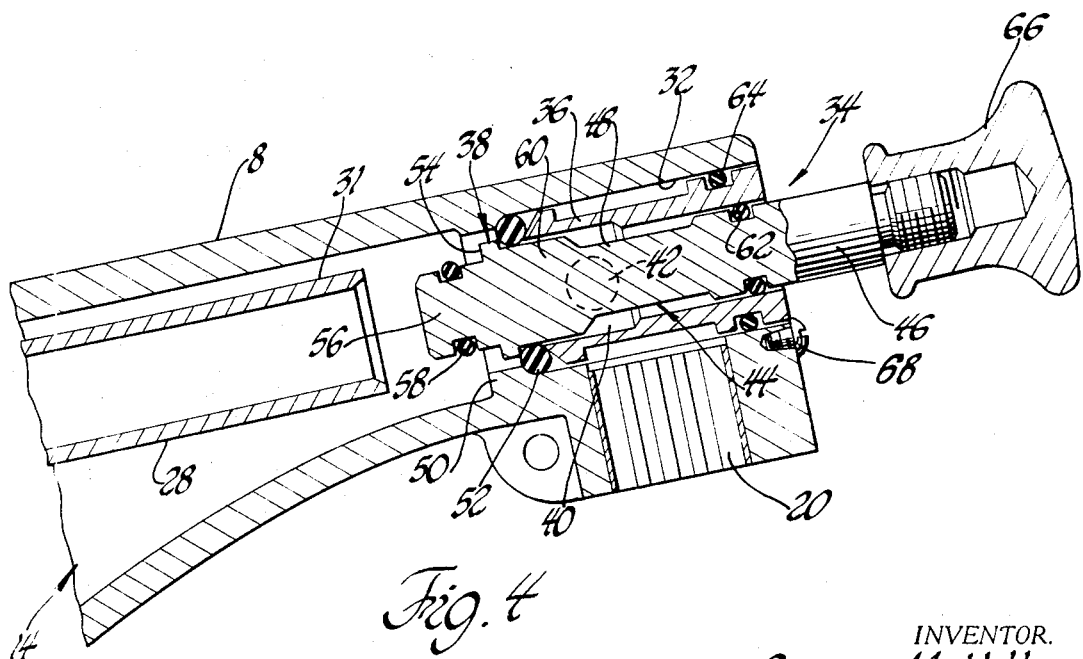
FIG. 4 is an enlarged fragmentary view of the spout portion shown in FIG. 2 with the diverter valve assembly in a different position.

The diverter valve means 34 comprises a diverter valve body 36 received in the recess 32, and a movable diverter valve element 38 controlling flow between the fluid inlet means 4 and 6 and the first and second outlets 20 and 22 by alternately moving between the positions shown in FIGS. 2 and 4. The valve body 36 comprises a sleeve member with an axial bore 40 therethrough, and a cross port 42 in the wall of the sleeve member defining a spout outlet passage providing communication between the inner end of the valve body 36 and the outlet 20. The valve element 38 closes the spout outlet passage in the first position of the diverter valve means shown in FIG. 4, and is operable to close the end 31 of the diverter tube in the second position of the diverter valve means 34.

The diverter valve means 34 further includes a stem 44 on the valve element 38 extending through the axial bore of the valve body 36. Stem 44 has an enlarged outer portion 46 spaced from the valve element 38 and engaging the wall of the axial bore 40 on the side of the cross-port 42 opposite the valve element 38, the stem having a reduced inner portion 48 extending between the valve element 38 and the outer portion 46 and spaced from the wall of the bore 40 to provide a passage for fluid flow. The bore 40 is of stepped diameter with the small diameter portion located adjacent the outer end of sleeve 36 and supporting the enlarged outer portion 46 of the stem 44.

An annular abutment 50 is formed in the spout portion 8, and an elastomeric O-ring 52 is received between the abutment 50 and the inner end of the valve body 36. The valve element 38 includes an outwardly projecting peripheral flange 54 engageable with the O-ring 52 in the first position of the diverter valve means shown in FIG. 4 to prevent flow between the mixing chamber 14 and the spout outlet 20. The valve element 38 includes a diverter tube control portion 56 projecting from flange 54 on the opposite side of the valve body 36. The diverter tube control portion 56 is operable to close the end 31 of the diverter tube 28 in the second position of the diverter valve means as shown in FIG. 2.

The diverter tube control portion 56 of the valve element 38 is in the form of a cylindrical projection which is received in the diverter tube 28 in the second position of the diverter valve means as illustrated in FIG. 2 and which is spaced from the end 31 of the diverter tube in the first position of the diverter valve means as shown in FIG. 4 so that water can flow from the mixing chamber 14 through the diverter tube 28 to outlet 22. The diverter tube control portion 56 is formed with a groove which receives a diverter tube controlling elastomeric O-ring 58. O-ring 58 sealingly engaged the diverter tube in the second position shown in FIG. 2.

The valve element 38 includes a sleeve control portion 60 on the opposite side of flange 54 from the diverter tube control portion 56. The sleeve control portion 60 is received in the axial bore 40 and in the O-ring 52 in the first position shown in FIG. 4, and is spaced from the valve body 36 in the second position shown in FIG. 2.

The outer portion 46 of the stem 44 is formed with a groove which receives a stem sealing O-ring 62 in sealing engagement with the wall of the sleeve member 36 in all positions of the stem. The sleeve member 36 is formed with a groove which receives a sleeve sealing O-ring 64 in sealing engagement with the diverter valve recess 32.

An operating knob 66 is threadedly mounted on the stem 44 for manually actuating the valve element 38 between the first and second positions by a push-pull action.

In installing the diverter valve assembly 34, the diverter valve assembly 34 is inserted into the recess 32, until O-ring 52 engages the abutment 50 which operates as a stop for the assembly 34. A set screw 68 is threadedly mounted in the outer end of the spout portion 8 such that the head portion of the set screw 68 engages the outer end of the valve body 36 to retain the assembly 34 in the recess 32.

In assembling the diverter tube 28 to the housing 2 during the manufacture of the faucet, the diverter tube 28 is inserted through the recess 32, and end 29 of the diverter tube 28 may be press-fit into the opening in the partition 26 to mount the diverter tube 28 in the housing.

Figure 3:
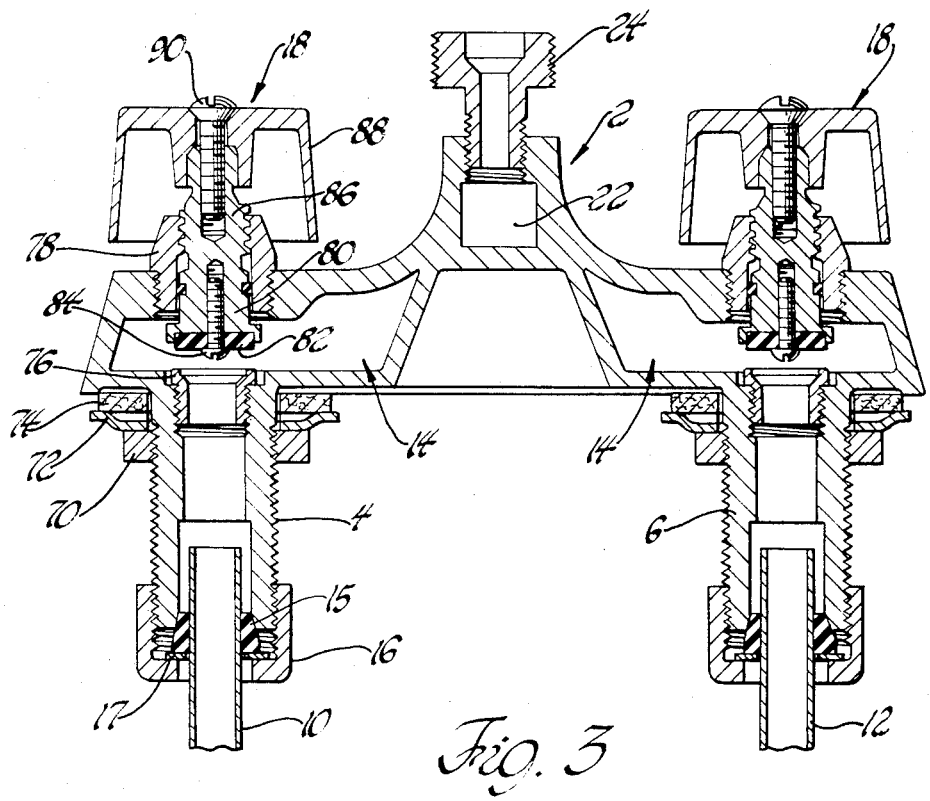
FIG. 3 is a sectional view taken on lines 3—3 of FIG. 2.

With reference to FIG. 3, each of the inlets 4 and 6 is externally threaded to receive a mounting nut 70. As shown in FIG. 3, a fibre washer 74 and corrugated steel washer 72 are retained on the inlet 4 by nut 70 for mounting the housing 2 on the ledge of a sink or lavatory.

The valve assemblies 18 each include a valve stem 80 having a resilient valve element 82 secured thereto by a screw 84. The valve stem 80 is rotatably mounted in a valve bonnet 78 by a helical threaded portion 86 in such a manner that valve element 82 moves vertically into and out of engagement with a valve seat member 76. The valve seat member 76 is threadedly mounted in the upper end of inlet 4, and the valve bonnet 78 is threadedly mounted on opening in housing 2 coaxial with the inlet 4. Operation of the valve assembly 18 takes place by manually rotating a handle 88 non-rotatably mounted on stem 80 and secured thereto by a screw 90.

While a specific form of the invention has been illustrated and described in the foregoing specification and accompanying drawings, it should be understood that the invention is not limited to the exact construction shown but that various alternatives in the construction and arrangement of parts, all falling within the scope and spirit of the invention will be apparent to those skilled in the art.

I claim:

1. A faucet comprising: a housing having fluid inlet means and a spout portion projecting from said housing; a first outlet in said spout portion; a second outlet in said housing remote from said first outlet; means defining a diverter tube support in said housing; a diverter tube having one end supported in said diverter tube support, said diverter tube extending from said support substantially in coaxial relationship with said spout; means defining a passage connecting said one end of said diverter tube with said second outlet; a diverter valve recess in the end of said spout portion remote from said housing, said diverter valve recess being spaced from the other end of said diverter tube and in substantial coaxial relationship therewith; and diverter valve means mounted in said diverter valve recess having a first position permitting fluid communication between said fluid inlet means and the other end of said diverter tube while simultaneously blocking fluid communication between said fluid inlet means and said first outlet, and a second position permitting fluid communication between said inlet means and said first outlet while simultaneously blocking fluid communication between said inlet means and said diverter tube; said diverter valve means comprising a diverter valve body received in said diverter valve recess, and a movable diverter valve element controlling flow between said fluid inlet means and said first and second outlets; said valve body having an inner end spaced from said other end of said diverter tube and a spout outlet passage formed therein providing communication between said inner end and said first outlet, said valve element being operable to close said passage in the first position of said diverter valve means, and operable to close said other end of said diverter tube in the second position of said diverter valve means; said valve body comprising a sleeve member with an axial bore therethrough with a cross-port in the wall of said sleeve member defining said spout outlet passage; and further including a stem on said valve element extending through said axial bore, said stem having an enlarged outer portion spaced from said valve element and engaging the wall of said axial bore on the side of said cross-port opposite said valve element in both positions of said valve element, and a reduced inner portion extending between said valve element and said outer portion and spaced from the wall of said bore.

2. A faucet as claimed in claim 1 including an abutment in said spout portion, and an elastomeric O-ring received between said abutment and said inner end of said valve body.

3. A faucet as claimed in claim 2 wherein said valve element includes an outwardly projecting peripheral flange engageable with said O-ring in the first position of said diverter valve means.

4. A faucet as claimed in claim 3 wherein said valve element includes a diverter tube control portion on the opposite side of said peripheral flange from said sleeve, said diverter tube control portion being operable to close said other end of said diverter tube in the second position of said diverter valve means.

5. A faucet as claimed in claim 4 wherein said diverter tube control portion comprises a cylindrical projection which is received in said diverter tube in the second position of said diverter valve means and which is spaced from said other end of said diverter tube in the first position of said diverter valve means.

6. A faucet as claimed in claim 5 including a groove in said diverter tube control portion, and a diverter tube controlling elastomeric O-ring mounted in said groove and sealingly engageable with said diverter tube in said second position.

7. A faucet as claimed in claim 6 wherein said valve element includes a sleeve control portion on the opposite side of said peripheral flange from said diverter tube control portion, said sleeve control portion being received in said axial bore in said first position and being spaced from said valve body in said second position.

8. A faucet as claimed in claim 7 including a groove in said outer portion of said stem and a stem sealing elastomeric O-ring mounted therein in sealing engagement with said axial bore.

9. A faucet as claimed in claim 8 including a groove in said sleeve member near the outer end thereof, and a sleeve sealing elastomeric O-ring mounted therein in sealing engagement with said diverter valve recess.

10. A faucet as claimed in claim 9 including retaining means mounted on said spout portion and engaging the outer end of said sleeve member for retaining said diverter valve means in said diverter valve recess.

11. A faucet as claimed in claim 10 wherein said retaining means comprises a set screw threadedly mounted in said spout portion.

12. A faucet as claimed in claim 11 further including an operating knob mounted on the outer end of said stem.

13. A faucet as claimed in claim 1 wherein said inlet means comprises a cold water inlet and a hot water inlet.

14. A faucet as claimed in claim 13 including a mixing chamber in said housing; a cold water valve controlling communication between said cold water inlet and said mixing chamber; and a hot water controlling communication between said hot water inlet and said mixing chamber; said diverter valve means selectively controlling communication between said mixing chamber and said first outlet, and between said mixing chamber and said diverter tube.

* * * * *